United States Patent [19]

Hermans et al.

[11] 4,210,729

[45] Jul. 1, 1980

[54] PREACTIVATED CATALYTIC COMPLEX SPOGOSPHERES

[75] Inventors: Jean-Pierre Hermans, Strombeek-Bever; Paul Henrioulle, Marilles, both of Belgium

[73] Assignee: Solvay & Cie., Brussels, Belgium

[21] Appl. No.: 391,737

[22] Filed: Aug. 27, 1973

[30] Foreign Application Priority Data

Aug. 25, 1972 [LU] Luxembourg .............................. 65954

[51] Int. Cl.$^3$ .......................... C08F 4/66; C08F 10/06
[52] U.S. Cl. ................................. 525/247; 252/429 B; 252/429 C; 526/119; 526/140; 526/142; 526/158; 526/351; 526/904
[58] Field of Search ....................... 252/429 B, 429 C; 260/93.7, 94.9 B, 94.9 E, 94.9 C; 526/119, 140, 142, 158; 525/247

[56] References Cited

U.S. PATENT DOCUMENTS 3,267,086  8/1966  Tornqvist ........................ 260/94.9 E

FOREIGN PATENT DOCUMENTS

1369718  7/1964  France .
2022414  7/1970  France .

*Primary Examiner*—Edward J. Smith
*Attorney, Agent, or Firm*—Spencer & Kaye

[57] ABSTRACT

Storage stability of Ziegler-type catalysts for α-olefin polymerization and having a specific surface greater than 75 m$^2$/g is improved by treating the catalysts with a preactivator which is an organic compound of a metal of one of Groups Ia, IIa, IIb and IIIa of the Periodic Table.

30 Claims, 1 Drawing Figure

PREACTIVATED CATALYTIC COMPLEX SPOGOSPHERES

CROSS-REFERENCE TO RELATED APPLICATION

The invention described herein is directly related to that described in copending Application Ser. No. 236,407, filed Mar. 21st, 1972. The entire text of that application is incorporated herein by reference.

BACKGROUND OF THE INVENTION

Ziegler-type microporous catalytic complexes having a specific surface area greater than 75 m²/g and useful for the polymerization of α-olefins are prepared by (a) reducing $TiCl_4$ by means of an aluminum alkyl; (a') optionally isolating the reduced solid, based on $TiCl_3$, from the medium in which it is formed; (b) treating this reduced solid with a complex forming agent; (c) removing any excess of the latter, if necessary; (d) bringing the solid treated in this way into contact with $TiCl_4$; and (e) isolating the catalyst complex thus formed.

These catalyst complexes are characterized by a markedly greater activity than that of the previously known systems and by very good stereospecificity.

However, during storage the activity of these catalysts tends to decline over the course of time. Hence it is necessary to use the catalyst shortly after its manufacture to assure reproducibility of catalyst activity.

SUMMARY OF THE INVENTION

The present invention is directed to imparting aging resistance to Ziegler-type microporous catalysts based on $TiCl_3$ and having a specific surface area greater than 75 m²/g and to the resulting storage stable catalysts. Such catalysts are complexes useful for stereospecific polymerization of α-olefins.

Storage stability of such microporous catalysts is greatly improved by preactivation with a preactivator shortly after catalyst complex preparation. Such complexes are preactivated by bringing them into contact with a preactivator which is an organic compound of a metal of one of groups Ia, IIa, IIb and IIIa of the Periodic Table.

The preparation of the catalyst complexes comprises the following steps:

(a) reduction of $TiCl_4$ to a solid product based on $TiCl_3$ by means of a reducing agent of the general formula $ALR_nX_{3-n}$, in which R is a hydrocarbon radical containing 1 to 18 carbon atoms, X is a halogen, and n is a number such that $0 < n \leq 3$;

(b) treatment of the thus prepared reduced solid with a complex forming agent which is an organic compound with at least one atom or group having at least one pair of free electrons capable of effecting coordination with titanium or aluminum and is a compound of one of the formulae:

wherein

R' is a hydrocarbon radical with from 1 to 15 carbon atoms, and
R" is a hydrocarbon radical with from 1 to 15 carbon atoms;

(c) reaction of the resulting treated solid with $TiCl_4$;

(d) isolation of the thus formed solid catalyst and, optionally, washing to remove the last traces of $TiCl_4$; and (e) preactivation of the resulting solid catalyst with a preactivator which is an organic compound of a metal of groups Ia, IIa, IIb or IIIa of the Periodic Table.

Steps (a) to (d) are the same as those of the process of preparation described in the above-noted Application Ser. No. 236,407.

BRIEF DESCRIPTION OF THE DRAWING

The single FIGURE (FIG. 1) provides plots of cumulative pore volume in cubic centimeters per gram against pore radius in Angstroms for three preactivated catalytic complexes.

DESCRIPTION OF THE PREFERRED EMBODIMENTS

The preactivated catalytic complexes of this invention are used in the same manner and for the same purposes as their nonpreactivated counterparts disclosed in the cited Application Ser. No. 236,407.

The sole requirement for organic compound employed for preactivation is that the compound be that of a metal, e.g. an organometallic compound, of one of groups:

Ia—e.g. lithium, such as ethyllithium and butyllithium; sodium, such as amylsodium, ethylsodium and sodium anilide; potassium, such as triphenylborylpotassium;

IIa—e.g. beryllium, such as dimethylberyllium; magnesium, such as ethylmagnesium chloride; calcium, such as ethylcalcium iodide;

IIb—e.g. zinc, such as dimethylzinc; cadmium, such as dibutylcadmium; mercury, such as methylmercuric chloride; and IIIa—e.g. boron, such as triethylboron and dimethyloxyboron chloride; aluminum, such as triethylaluminum, gallium, such as triethylgallium; indium, such as trimethylindium; thallium, such as triethylthallium.

It is preferred to have an organic compound of aluminum of the formula $$ALR'_p(OR'')_mX_{3-(p+m)} \quad (I)$$

wherein
R' is a hydrocarbon radical containing from 1 to 18 (preferably from 1 to 12) carbon atoms, e.g. alkyl (such as methyl, ethyl, isobutyl and dodecyl), aryl (such as phenyl and naphthyl), aralkyl (such as benzyl), alkylaryl (such as tolyl) and cycloalkyl, preferably having from 5 to 7 ring carbon atoms (such a cyclohexyl);

R" is, independently, one of the meaning of R';

X is a halogen, preferably chlorine;

p is a positive number which is at most equal to 3, preferably from 1.5 to 2.5, inclusive;

m is a number from zero to 1, inclusive, preferably from 0.3 to 0.8, inclusive; and (p+m) is a positive number of at most 3.

Best results are obtained when each of R' and R" contains from 2 to 6 carbon atoms.

The amount of preactivator used is such that the molar ratio of the preactivator to the complex forming agent present in the catalyst complex is greater than or equal to 1. When the preactivator is an organic compound of aluminum, e.g., the amount of preactivator is preferably such that the atomic ratio of aluminum/- titanium in the activation medium is between 0.01 and 20, best results being obtained when the atomic ratio of aluminum/titanium is between 0.03 and 7.5.

The preactivation temperature is not critical. Preactivation is advantageously carried out at a temperature of between −10° and +100° C.

Equally, the duration of preactivation is not critical either. Preferably, a duration of between 1 and 80 minutes is used.

On the other hand, the point at which the preactivation treatment is carried out is an essential characteristic of the invention; the base catalytic complex must be freshly prepared. It is thus indispensable that preactivation treatment be carried out less than 10 hours, and preferably less than 3 hours, after the preparation of the catalyst complex. The treatment is effected before there is a material loss in catalyst activity. Best results are obtained when this treatment is carried out less than one hour after the preparation of the complex; the preactivation treatment is advantageously carried out immediately after reaction of the treated solid with TiCl$_4$, i.e. as soon as the latter is separated from the catalyst complex.

Preactivation is generally carried out by means of a solution of a preactivator in an inert solvent, preferably a hydrocarbon solvent. This solvent is generally identical to the solvent used during washing of the catalyst complex and/or identical to the diluent used for the polymerization.

Thus prepared preactivated catalyst complexes only differ slightly, from the point of view of their physical properties, from the nonactivated catalyst complexes from which they are prepared. They are in the form of spherical particles of uniform structure and density, the diameter of which is generally between 5 and 100 microns and the apparent specific gravity of which is high, generally greater than 0.6 kg/dm$^3$. They consist of spherical particles which themselves consist of an agglomerate of micro-particles of more or less spherical shape and of a diameter between 0.05 and 1 micron, having a spongy structure due to the fact that they consist of crystallites of dimensions in the order of 50 to 100 Å.

The particular structure of the preactivated complex particles of the invention can be summarized, just like that of the nonactivated complexes, by referring to them as "spogospheres".

The preactivated catalyst complexes of the invention have a specific surface area greater than 75 m$^2$/g, preferably greater than 100 m$^2$/g, which can be as high as 200 m$^2$/g. They are based on a TiCl$_3$ of violet color, belonging to the delta crystalline form according to generally adopted classification (Journal of Polymer Science, 51, 1961, pages 399–420).

The positions of beams of X-ray diffraction spectra of preactivated catalyst complexes are identical, within the accuracy of measurements, to those of the corresponding nonactivated catalyst complexes.

When the compound used for preactivation of the catalyst complex is an organic compound of aluminum of formula (I), the preactivated catalyst complexes of the present invention correspond to the following formula:

(II)

wherein

R'''has one of the meanings previously given for R';
each of R''and X has its previously ascribed meaning;

m' is less than or equal to m;
p' is a number from zero to 3, inclusive;
(p'+m') is a number from zero to 3 inclusive, and preferably from zero to 2, inclusive, best results being obtained when (p'+m') is 1;
x is the number of molecules of aluminum compound per molecule of TiCl$_3$; this number is less than 1, preferably less than 0.5, and is generally greater than the factor x which characterizes the number of molecules of aluminum compound per molecule of TiCl$_3$ in the corresponding nonpreactivated catalyst complex;
C is the complex forming agent used to prepare the treated solid; and
y is the number of molecules of complex forming agent per molecule of TiCl$_3$; it is less than 0.009 and less than the number y which characterizes the number of molecules of complex forming agent per molecule of TiCl$_3$ in the corresponding nonpreactivated complex.

According to a further alternative embodiment of the present invention, preactivated catalyst complexes are optionally treated with at least one alpha-olefine, such as ethylene, propylene, butene-1, pentene-1, methylbutene-1, hexene-1, 3- and 4-methylpentene-1 and vinylcyclohexane, the molecule of which contains from 2 to 18, preferably from 2 to 6, carbon atoms. In this way, a prepolymerization is carried out. This treatment may or may not be carried out in the presence of a fresh quantity of an organometallic activator. It can be carried out simultaneously with, or subsequently to, the preactivation treatment.

The prepolymerization can be carried out in accordance with any known process, in solution or in suspension in a hydrocarbon solvent or a hydrocarbon diluent which is preferably an aliphatic or cycloaliphatic hydrocarbon, such as propane, butane, pentane, hexane, heptane, cyclohexane, methylcyclohexane or any mixture thereof. It is also possible to carry out the prepolymerization in the monomer or in one of the monomers kept in the liquid state or in the gas phase.

The prepolymerization temperature is generally between −10° and +100° C. and preferably between 20° and 80° C. when the prepolymerization is carried out in suspension. The pressure is generally between atmospheric pressure and 50 atmospheres and preferably between 1 and 25 atmospheres. This pressure is of course a function of the temperature used.

The amount of preactivated catalyst complex employed is determined by its TiCl$_3$ content. Its concentration of TiCl$_3$ in the prepolymerization medium is generally greater than 0.01 mmol of TiCl$_3$ per liter of diluent, of liquid monomer or of reactor volume, and preferably greater than 0.1 mmol per liter.

The ratio of amounts of organometallic compound and of preactivated catalyst complex is not critical either. The molar ratio of total organometallic compound/TiCl$_3$ present in the preactivated catalyst complex is generally greater than 0.5. The molar ratio of preactivator to TiCl$_3$ ranges, e.g., from 0.01 to 20 and, preferably, from 0.03 to 7.5.

The amount of monomer employed in the prepolymerization is such that the ratio of total prepolymer weight to preactivated catalyst complex weight is less than 1,000. It depends on the required properties and envisages use of the prepolymer; when the latter is intended to catalyze a suspension polymerization, it is desirable to obtain a prepolymer of relatively fine particle size, and the weight ratio of prepolymer to preactivated catalyst complex is preferably limited to a value of between 1.5 and 5. On the other hand, when prepolymer is intended to be used in a gas phase polymerization in a fluidized or stirred bed, the ratio is preferably between 100 and 1,000.

The duration of prepolymerization is not critical and depends on the amount of monomer which is prepolymerized. In general, the duration is between 2 and 40 minutes.

Thus obtained prepolymer is useful as the catalyst constituent for actual polymerization without subsequent treatment, or can be isolated, by decantation or filtration, from the medium in which it is formed.

Preactivated catalyst complexes of the invention are used, optionally after prepolymerization, for polymerizing alpha-olefins under the same conditions as those specified in the previously cited Application Ser. No. 236,407, to obtain highly crystalline polymers.

An organometallic compound of a metal of one of groups Ia, IIa, IIb and IIIa of the Periodic Table, preferably an organic compound of aluminum of the formula $$AlR_{p''}^{IV}(OR^{V})_{m''}X_{3-(p''+m'')} \quad (III)$$

in which each of $R^{IV}$, $R^{V}$, p'', m'' and X has the same meaning as R', R'', p, m and X, respectively, in formula (I), is optionally added during such alpha-olefin polymerization. Compounds of formula (III) are identical to or different from, but of the same nature as, those used as preactivators of the catalyst complex. Best results are obtained by using diethylaluminum chloride and/or an alkylalkoxyaluminum halide, e.g. ethoxy ethyl aluminum chloride which insure maximum activity and stereospecificity of the catalyst system.

Thus defined catalyst systems are applicable to the polymerization of olefins with terminal unsaturation and containing 2 to 18, preferably 2 to 6, carbon atoms in the molecule. They are of particular value for the polymerization of propylene. They are also applicable to the copolymerization of these alpha-olefins with one another and with diolefins, such as butadiene, containing 4 to 18 carbon atoms.

These catalyst systems are also useful in preparing so-called block copolymers which are made up from alpha-olefins. Such block copolymers consist of successions of segments of varying chain lengths; each segment consists of a homopolymer of an alpha-olefin or of a statistical copolymer containing at least two alpha-olefins.

The process of the invention lends itself particularly well to the manufacture of homopolymers of propylene and of copolymers containing at least 50% by weight of propylene and preferably 75% by weight of propylene.

The polymerization can be carried out according to any known process, in solution or in suspension in a hydrocarbon solvent or a hydrocarbon diluent which is preferably an aliphatic or cycloaliphatic hydrocarbon, such as butane, pentane, hexane, heptane, cyclohexane, methylcyclohexane or any mixture of two or more of the foregoing. The polymerization can also be carried out in the monomer or in one of the monomers, kept in the liquid state, or in the gas phase. In this latter technique, the use of a prepolymer is particularly advantageous.

The polymerization temperature is generally between 20° and 200° C. and preferably, when working in suspension, between 50° and 80° C. The pressure is generally between atmospheric pressure and 50 atmospheres and preferably between 10 and 25 atmospheres. This pressure is of course a function of the temperature used.

The polymerization is alternatively carried out continuously or discontinuously.

So-called block copolymers are also prepared according to known processes.

The amount of preactivated or preactivated and prepolymerized catalyst complex employed depends on its $TiCl_3$ content. Its concentration in the polymerization medium is generally greater than 0.01 mmol of $TiCl_3$ per liter of diluent, of liquid monomer or of reactor volume, and preferably greater than 0.2 mmol per liter.

The molecular weight of the polymers manufactured according to the process of the invention is regulated, e.g., by adding to the polymerization medium one or more molecular weight regulators, such as hydrogen, zinc diethyl, alcohols (such as octanol), ethers (such as diethylether) and alkyl halides (such as butylchloride).

The stereospecificity of the preactivated catalyst complexes of the invention is extremely high and approximately equal to that of the complexes prior to preactivation.

The activity of the preactivated catalyst complexes of the invention is as high as that of the nonpreactivated catalyst complexes.

Furthermore, the preactivated catalyst complexes of the invention preserve their initial activity longer than the catalyst complexes of the previously cited Application Ser. No. 236,407. For this reason, the preactivated catalyst complexes of the invention are often prepared long before use in alpha-olefin polymerization and stored for long periods and in large quantities. Periods of storage of the preactivated catalyst complexes of the invention in the order of 100 days or more are common without noticeable change in the properties of the catalyst complexes. They thus permit infrequent use of installations for the preparation of the catalyst and of the requisite personnel.

The activity and stereospecificity of the preactivated catalyst complexes of the invention are remarkably high in the homopolymerization of propylene. Their excellent stereo-specificity makes it possible to omit purification (to remove an amorphous fraction) of resulting polymer, thus providing a very considerable saving in power, in raw materials and in equipment. Poly-alpha-olefins prepared with the preactivated catalyst complexes are useful in the same manner and for the same purposes as stereospecific poly-alpha-olefins prepared with other catalysts.

The high activity and the high productivity of the preactivated catalyst complexes of the invention make it possible to obtain polymers with a very low content of catalyst residue. This content is less than 100 ppm and is generally in the order of only 30 ppm of titanium. For numerous applications no polymer purification is required to remove catalyst residue.

The examples which follow serve solely to illustrate the invention. They are merely exemplary in nature and in no way limitative. In the examples, the symbols used have the following meaning and are expressed in the units listed below:

C/Ti: molar ratio of the amount of complex forming agent and that of $TiCl_3$ present in the catalyst complex (whether preactivated or not);

Al/Ti: molar ratio of the amount of aluminum compound and that of TiCl$_3$ present in the catalyst complex (whether preactivated or not);

S: specific surface area of the catalyst complex in n$^2$/g;

α: activity expressed conventionally in grams of polymer insoluble in the polymerization diluent obtained per hour and per gram of TiCl$_3$ contained in the catalyst complex (whether preactivated or not);

% soluble: expresses the weight of soluble polymer in the polymerization diluent relative to the total weight of polymer manufactured during the polymerization experiment;

G: torsional rigidity modulus for 60° of arc torsion and at 100° C. (draft specification ISO 469) expressed in kg/cm$^2$;

MFI: the melt flow index measured under a load of 2.16 kg at 230° C. and expressed in dg/min(ASTM Standard Specification D 1,238);

ASG: apparent density of the fluff expressed in g/dm$^3$;

Et: ethyl radical C$_2$H$_5$.

EXAMPLE 1

This describes successive stages in the manufacture of a preactivated catalyst complex. The catalytic properties of the preactivated catalyst complex are stable with time and thus distinguish it from its activated catalyst complex counterpart.

A. PREPARATION OF THE REDUCED SOLID 120 ml of dry hexane and 30ml of pure TiCl$_4$ are introduced, under a nitrogen atmosphere, into a 500 ml reactor equipped with a 2-vane stirrer rotating at 140 revolutions per minute. This hexane-TiCl$_4$solution is cooled to 1 ($\pm$1)° C. A solution consisting of 90 ml of hexane and of 34.2 ml of AlEt$_2$Cl is added thereto over the course of 4.5 hours while maintaining a temperature of 1($\pm$1)° C. in the reactor.

After addition of the AlEt$_2$Cl-hexane solution, the reaction medium (consisting of a suspension of fine particles) is stirred at 1($\pm$1)° C. for 15 minutes and is then heated to 23° C. over the course of one hour and thereafter to 65° C. over the course of about 0.5 hour. The medium is stirred for one hour at 65° C.

The liquid phase is then separated from the solid phase by filtration, and the solid product, referred to as "reduced solid", is washed 5 times with 100 ml of dry hexane, the solid being resuspended during each wash.

B. TREATMENT OF THE "REDUCED SOLID" WITH A COMPLEX FORMING AGENT

The reduced solid is suspended in 300 ml of diluent (hexane) and 48.5 ml of di-isoamyl ether (DIAE) are added thereto. The suspension is stirred for 1 hour at 35° C. Thereafter, the obtained "treated solid" is separated from the liquid phase.

C. REACTION OF THE TREATED SOLID WITH TICL$_4$

The treated solid is suspended in 100 ml of hexane and 70 ml of TiCl$_4$. The suspension is stirred at 65° C. for 2 hours.

The liquid phase is thereafter removed, and the obtained solid product, referred to as a "catalyst complex", is washed 4 times with 100 ml of hexane at 25° C. and finally once with 100 ml of hexane at 65° C.

The catalyst complex is separated from the hexane and dried by means of pure and dry nitrogen.

42 g of dry catalyst complex are collected. The chemical composition of the catalyst complex obtained is shown in Table 1.

Table 1

|  | C/Ti | Al/Ti |
|---|---|---|
| Catalyst complex | 0.085 | 0.026 |
| Preactivated catalyst complex | 0.0085 | 0.139 |

D. POLYMERIZATION OF PROPYELENE BY MEANS OF THE CATALYST COMPLEX (Reference Experiments)

1 liter of dry and purified hexane is introduced into a 5-liter stainless steel autoclave which has been flushed repeatedly with nitrogen. Thereafter, 400 mg of AlEt$_2$Cl (in the form of a 200 g/l solution in hexane) and 92 mg of the solid catalyst complex, representing 78 mg of TiCl$_3$, are successively introduced. The AlEt$_2$Cl/TiCl$_3$ molar ratio is thus 6.5.

The autoclave is heated to 60° C. and brought back to atmospheric pressure by slowly releasing gas. Thereafter, an absolute hydrogen pressure of 0.15 kg/cm$^2$ is set up in the autoclave and propylene is then introduced into the autoclave until a total pressure of 10.3 kg/cm$^2$ at the temperature in question is reached. This pressure is kept constant during the polymerization by introducing propylene gas into the autoclave.

Polymerization is stopped after 3 hours by releasing the propylene gas and introducing 20 ml of isopropyl alcohol into the autoclave.

The contents of the autoclave are poured into a Büchner filter, rinsed three times with 0.5 l of hexane and dried under reduced pressure at 50° C. 351 g of polypropylene which is insoluble in hexane are collected.

2.5 g of soluble polymer are found in the hexane used for polymerization and the wash hexane.

The catalyst properties obtained with this catalyst complex as well as the characteristics of the polymer which is insoluble in the hexane used in the polymerization and the wash hexane are shown in Table 2 for polymerization experiments carried out respectively 1 day and 100 days after the manufacture of the catalyst complex.

Table 2

| age (days) | α | % soluble | insoluble | | |
|---|---|---|---|---|---|
| | | | G | MFI | ASG |
| 1 | 1500 | 0.65 | 825 | 0.76 | 410 |
| 100 | 900 | 1 | 810 | 1 | 400 |

The activity of the catalyst complex decreases greatly with time.

E. CONVERSION OF THE CATALYST COMPLEX INTO A "PREACTIVATED CATALYST COMPLEX"

7 g of the catalyst complex obtained according to C are suspended in 50 ml of hexane 1 hour after the catalyst has been isolated. 10 ml of pure AlEt$_2$Cl are added. The suspension is stirred for 1 hour at 25° C. Thereafter the preactivated catalyst complex obtained is separated from the liquid phase, washed 3 times with 30 ml of hexane at 25° C. and dried with pure and dry nitrogen. About 6.5 g of preactivated catalyst complex are collected.

The chemical composition of the preactivated catalyst complex obtained is shown in Table 1.

F. POLYMERIZATION OF THE PROPYLENE BY MEANS OF THE PREACTIVATED CATALYST COMPLEX

This is carried out as described above in paragraph D.

The catalyst properties of the obtained preactivated catalyst complex and the characteristics of the resulting polypropylene are shown in Table 3 when the preactivated catalyst complex is used, 1 day and 118 days, respectively, after its manufacture.

Table 3

| age (days) | α | % soluble | insoluble G | MFI | ASG |
|---|---|---|---|---|---|
| 1 | 1440 | 0.9 | 801 | 0.98 | 397 |
| 118 | 1270 | 0.9 | 809 | 1.2 | 393 |

G. CHARACTERISTICS OF THE PREACTIVATED CATALYST COMPLEX

The specific surface area (according to British Standard Specification BS 4,369/1), the porosity and the texture of the preactivated catalyst complex were determined by the $N_2$ adsorption method at the temperature of liquid nitrogen, and by the Hg penetration method.

According to the latter method, a preactivated catalyst complex is placed in a test tube to determine the distribution of the pore volume therein as a function of the pore radii. Mercury is introduced into the test tube, and a pressure varying from 1 to 1,000 kg absolute/cm² is exerted on the whole. Under the effect of the pressure, the mercury enters the pores of the sample, and the corresponding variation in volume is measured. This method makes it possible to determine the pore volume distribution as a function of the radii of the pores below 75,000 Å and above 75 Å.

The conjoint use of the nitrogen adsorption method for the pores of radii below 75 Å and of the mercury penetration method for the pores of radii of between 75 and 75,000 Å makes it possible to determine the pore volume distribution as a function of the radii of the pores below 75,000 Å. It is easy to calculate the total pore volume by integration.

These characteristics are shown below:

| Specific surface area | | m²/g | 166 |
|---|---|---|---|
| Pore volume (cm³/g) | measured by $N_2$ (pore radii < 500 Å) | | 0.20 |
| | measured by Hg (pore radii > 75 Å) | | 0.52 |
| | measured by $N_2$+Hg (pore radii < 7.5μ) | | 0.59 |

Figure 1:
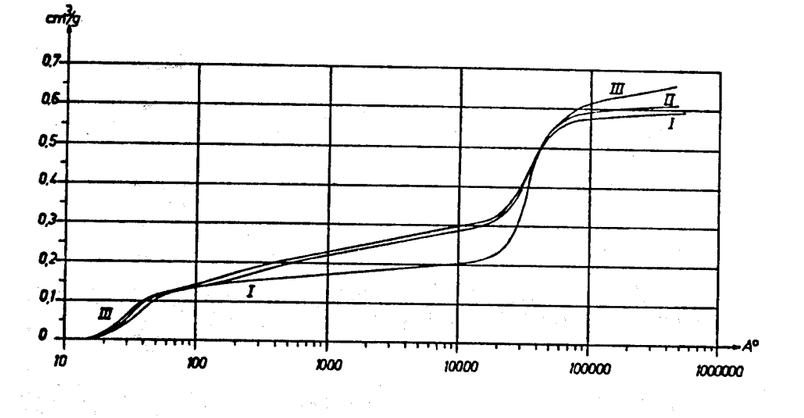

The combined nitrogen adsorption method and mercury penetration method give curve (I) [sole figure of drawing] for the preactivated catalyst complex.

In this figure, the cumulative pore volume in cm³/g has been plotted as the ordinate and the pore radius expressed in Å has been plotted as the abscissa, in a semilogarithmic diagram. Two main zones can be seen in this diagram:

the zone corresponding to pores of radii below 15,000 Å and attributed to the "internal" pore volume of the spherical particles; and the zone corresponding to pores of radii above 15,000 Å and attributed to the "external" pore volume, contained between the spherical particles.

In the zone comprising the pores of radii below 15,000 Å it is possible to distinguish:

that of radii of pores below 200 Å and corresponding to the "internal" pore volume of the microparticles constituting the spherical particles; and that of radii of pores above 200 Å and corresponding to the "external" volume contained between the microparticles constituting the spherical particles.

The adsorption and desorption isotherm was determined at the temperature of liquid nitrogen. Evaluation of this isotherm makes it possible:

to establish the graph of the "t-diagram" according to the method of LIPPENS and de BOER [J. Colloid and Interface Sci, 21, page 405, (1966), J. Catalysis, 3, pages 32, 38 and 44, (1964), Structure and Texture of Aluminas, Thesis, Delft, (1961)];

to classify the isotherms and the hysteresis loops in accordance with the methods of "de BOER" [The Structure and Properties of Porous Materials—Everett and Stone, Butterworth, London, (1958)] and of BRUNAUER, L. DEMING, W. DEMING and TELLER [J. Am. Chem. Soc., 62, page 1,723 (1940)]; and to calculate the distribution of the specific surface area and of the pore volume as a function of the sizes of the pores according to the method of BROEKHOFF and de BOER [J. Catalysis, 9, pages 8 and 15, (1967) and 10, pages 153 and 368 (1968)].

The combination of the information obtained by the above methods makes it possible to state that:

the solid catalyst complex displays the phenomenon of capillary condensation of nitrogen and is characterized by nitrogen adsorption isotherms of type IV according to J. Am. Chem. Soc., 62, (1940), page 1,723 and by a hysteresis loop of type E according to "The Structure and Properties of Porous Materials", Everett-Stone, Butterworth, London (1958), pages 68 to 94. Hence, the catalyst complex of the invention possesses pores formed by agglomerates of spheroidal particles (spogospheres).

The existence of the microparticles in the spogospheres and the texture of the microparticles have been confirmed by observations made with an electron microscope on a sample of the catalyst complex broken up to render the material transparent.

Under a magnification of 100,000, the spongy structure, forming a sort of network of which the mesh size is of the order of 50 to 100 Å, is very clearly observed.

Furthermore, it has been observed under the optical microscope (magnification 200) that the particles of the reduced solid, of the treated solid and of the catalyst complex are spherical in shape.

The size of these spherical particles is between 5 and 20 microns.

The apparent specific gravity of the preactivated catalyst complex is 0.9 kg/dm³.

The X-ray diffraction spectra of the catalyst complex as it stands (nonactivated) and in the "preactivated" state are shown in Table 4.

The X-ray diffraction spectra used to show the structure of the catalyst components were recorded by means of a focusing goniometer equipped with a monochromator.

The preactivated catalyst complex of the invention and the nonactivated catalyst complex are based on a $TiCl_3$ of violet color belonging to the delta crystalline form according to the classification generally adopted (Journal of Polymer Sci., 51, 1961, pages 399–410).

Examination of Table 4 shows that the activation does not change the X-ray diffraction spectra.

Examples 2 to 10 related to variation in the manufacturing parameters of the preactivated catalyst complex. All are obtained with the catalyst complex of which the manufacture is described in Example 1.

In Examples 2 to 7, the catalyst complex is in every case converted into a preactivated catalyst complex by means of AlEt$_2$Cl; the examples are given to illustrate the range of variation of the manufacturing parameters of the preactivated catalyst complex, such as the AlEt$_2$Cl/TiCl$_3$ molar ratio, the temperature and the time. The physico-chemical characteristics of the preactivated catalyst complexes of Examples 2 to 7 are shown in Table 5.

Examples 2 and 3 relate to the variation in the AlEt$_2$/TiCl$_3$ molar ratio during preactivation.

EXAMPLE 2

4.9 g of the catalyst complex of Example 1 are suspended in 50 ml of hexane within an hour following its preparation. 2 ml of pure AlEt$_2$Cl are added thereto. The suspension is heated to 65° C. for 1 hour. Thereafter the solid is separated from the liquid phase and washed 3 times with 50 ml of hexane and then dried.

EXAMPLE 3

6 g of the catalyst complex of Example 1 are suspended in 500 ml of hexane within an hour following its preparation. 33 ml of pure AlEt$_2$Cl are added thereto. The suspension is kept at 25° C. for 1 hour. Thereafter the solid is isolated as in Example 2.

The catalytic properties of the preactivated catalyst complexes of Examples 2 and 3, evaluated 60 days after their manufacture under the polymerization conditions of Example 1 except as regards the temperature, which in this case is 70° C. are shown in Table 6.

EXAMPLES 4 and 5

These relate to the variation in the temperature of reaction of the catalyst complex with AlEt$_2$Cl to form the preactivated catalyst complex.

The preactivated catalyst complexes are manufactured as in Example 1—paragraph E, except as regards the temperature, which is −10° C. for Example 4 and +100° C. for Example 5. In the latter case, isododecane rather than hexane is used as the reaction medium.

The properties of the preactivated catalyst complexes, evaluated 60 days after their manufacture, under the polymerization conditions of Example 1, are shown in Table 6.

EXAMPLES 6 and 7

These relate to the variation in the time of reaction of AlEt$_2$Cl with the catalyst complex to form the preactivated catalyst complex.

EXAMPLE 6

The preactivated catalyst complex is manufactured as in Example 1—paragraph E, except as regards the time, which is 5 minutes.

The catalytic properties of the preactivated catalyst complex, tested under the polymerization conditions of Example 1, 67 days after the manufacture of the catalyst, are shown in Table 6.

EXAMPLE 7

15.3 g of the catalyst complex of Example 1 are suspended in 500 ml of hexane within an hour following its manufacture. 20 ml of pure AlEt$_2$Cl are added thereto. The suspension is heated to 60° C. for 80 minutes. Thereafter the solid is isolated as in Example 2.

The catalytic properties, evaluated at 70° C., all other polymerization conditions being identical to those of Example 1, are described in Table 6.

Table 5

| Example No. | C/Ti | Al/Ti | S |
|---|---|---|---|
| 2 | 0.0059 | 0.168 | 161 |
| 3 | 0.0078 | 0.197 | 148 |
| 4 | 0.0079 | 0.097 | 160 |
| 5 | 0.007 | 0.146 | 184 |
| 6 | 0.007 | 0.079 | 172 |
| 7 | 0.0096 | 0.138 | 153 |

TABLE 4

| Nature of the solid catalyst component | | Catalyst complex of Example 1 | | | | | | | | | | |
|---|---|---|---|---|---|---|---|---|---|---|---|---|
| | | non-activated | | | | | | preactivated | | | | |
| Lattice spacing, A | | 5.83 | 5.19 | 2.95 | 2.71 | 1.773 | 1.697 | 5.86 | 5.29 | 2.97 | 2.72 | 1.774 | 1.700 |
| Relative intensity | integrated value S/SO (1) | 49 | 42 | 12 | 100 | 32 | 14 | 41 | 37 | 12 | 100 | 32 | 16 |
| | maxima value H/HO (2) | 100 | 56 | 21 | 121 | 88 | 24 | 100 | 58 | 22 | 137 | 93 | 28 |
| Beam width at half-height (angle 2 theta, in degrees) | | 1.22 | 2.30 | 1.97 | 2.16 | 0.94 | 2.15 | 1.16 | 1.86 | 1.82 | 2.25 | 1.01 | 1.80 |

(1) S represents the relative integrated value of the surface of the peak corresponding to the lattice spacing mentioned in the same column, compared to the integrated value SO arbitrary fixed at 100 for the lattice spacing 2.71 A (non-activated catalyst complex) and 2.72 A (preactivated catalyst complex).
(2) H represents the relative maxima value of the height of the peak corresponding to the lattice spacing mentioned in the same column, compared to the maxima value HO arbitrary fixed at 100 for the lattice spacing 5.83 A (non-activated catalyst complex) and 5.86 A (preactivated catalyst complex).

Table 6

| Example No. | Age of the preactivated complex (days) | α | % soluble | Insoluble | | |
|---|---|---|---|---|---|---|
| | | | | G | MFI | ASG |
| 2 | 60 | 1,863 | 1 | 674 | 1.1 | 397 |
| 3 | 60 | 2,100 | 1.2 | 698 | 0.5 | 400 |
| 4 | 60 | 1,270 | 1 | 823 | 1 | 375 |
| 5 | 60 | 1,040 | 1 | 791 | 1.2 | 372 |
| 6 | 67 | 1,140 | 0.73 | 856 | 1.5 | 368 |
| 7 | 1 | 1,885 | 0.7 | 694 | 1.3 | 457 |
| 7 | 86 | 1,600 | 1.2 | 698 | 0.5 | 456 |
| 8 | 55 | 1,350 | 0.95 | 863 | 1.5 | 386 |

EXAMPLE 8

5.2 g of the catalyst complex of Example 1 are suspended in 50 ml of hexane within an hour following its preparation. 2 ml of aluminum sesquichloride are added thereto, and the suspension is stirred for 30 minutes at a temperature of 25° C. Thereafter the solid is separated off, washed and dried by means of pure and dry nitrogen.

The obtained solid preactivated catalyst complex is characterized by the following chemical composition:

| | | |
|---|---|---|
| C/Ti | : | 0.0068 |
| Al/Ti | : | 0.153 |

The specific surface area is 186 m²/g.

When used as a solid catalyst component under the polymerization conditions of Example 1, the results shown in Table 6 are obtained.

EXAMPLES 9 and 10

These examples show the respective use of AlEtCl$_2$ and AlEt$_3$ as preactivators in the manufacture of the preactivated catalyst complex under the manufacturing conditions of Example 1.

The characteristics of the preactivated catalyst complexes obtained by replacing AlEt$_2$Cl by AlEtCl$_2$ and by AlEt$_3$, respectively, in the manufacture of the preactivated catalyst complex of Example 1—E are shown in Table 7.

Table 7

| Example No. | | | 9 | 10 |
|---|---|---|---|---|
| Specific surface area, m²/g | | | 188 | 183 |
| Pore | measured by N$_2$ (pore radius < 500 A) | | 0.40 | 0.30 |
| volume | measured by Hg (pore radius > 75 A) | | 0.47 | 0.53 |
| in cm³/g | measured by Hg + N$_2$ (pore radius < 7.5μ) | | 0.62 | 0.66 |
| Chemical composition | C/Ti | | 0.0031 | 0.0063 |
| | Al/Ti | | 0.178 | 0.2 |

Curves (II) and (III) of the sole FIGURE relating to the preactivated catalyst complexes of Examples 9 and 10 show that the "spogospheroidal" morphology is obtained regardless of the nature of the aluminum alkyl used as the preactivator.

EXAMPLES 11 to 15

These examples relate to the conversion of the catalyst complex of Example 1 into a solid catalyst component which is morphologically different from the initial catalyst complex but is characterized by excellent stability of its catalytic activity with time.

Examples 11 to 13 describe the use of C$_3$H$_6$ as the alpha-olefin for the treatment of the catalyst complex in the presence of AlEt$_2$Cl.

EXAMPLE 11

10.8 g of the catalyst complex of Example 1 are immediately suspended in a solution containing 200 ml of hexane and 15 ml of AlEt$_2$Cl. Gaseous propylene is introduced into the stirred suspension at a temperature of 25° C. until a partial pressure of 250 g/cm² is reached, and this pressure is kept constant for 10 minutes. Thereafter, the solid obtained is isolated, washed 3 times with 200 ml of hexane and dried with pure and dry nitrogen.

18.5 g of solid, containing 478 g of TiCl$_3$ per kg of solid, are collected.

This solid has the following characteristics:

| | | |
|---|---|---|
| Al/Ti | : | 0.168 |
| C/Ti | : | 0.0043 |
| S | : | 1 |

Catalytic properties evaluated under the polymerization conditions of Example 1, using 203 mg of solid manufactured as described above, are shown in Table 8.

Table 8

| Age (days) | α | % soluble | Insoluble | | |
|---|---|---|---|---|---|
| | | | G | MFI | ASG |
| 1 | 1,480 | 0.7 | 811 | 1 | 400 |
| 150 | 1,290 | 0.5 | 800 | 0.9 | 375 |

EXAMPLES 12 and 13

The catalyst complex of Example 1 is treated in the same way as in Example 11 except as regards the time of contact with the propylene, which is 0.5 minute for Example 12 and 30 minutes for Example 13.

11.7 g of solid are collected in Example 12 and 32.4 g of solid in Example 13, respectively. The chemical composition of the solids and their characteristics behavior in polymerization under the conditions of Example 1, 93 days after their manufacture, are shown in Table 9.

Table 9

| Example No. | C/Ti | Al/Ti | α | % soluble | ASG |
|---|---|---|---|---|---|
| 12 | 0.02 | 0.14 | 1,450 | 0.8 | 396 |
| 13 | 0.02 | 0.27 | 1,500 | 0.4 | 393 |

EXAMPLES 14 and 15

These examples respectively relate to the use of butene and hexene rather than propylene for reaction with the catalyst complex in the presence of AlEt$_2$Cl.

EXAMPLE 14

The catalyst complex of Example 1 is brought into contact with butene under the same conditions as those of Example 11. The TiCl$_3$ content of the resulting solid remains very close to that of the initial catalyst complex (Example 1).

Its catalytic properties are shown in Table 10.

Table 10

| Age (days) | α | % soluble | Insoluble | | |
|---|---|---|---|---|---|
| | | | G | MFI | ASG |
| 1 | 1,280 | 0.4 | 830 | 2 | 418 |
| 30 | 1,440 | 0.5 | 810 | 1.2 | 405 |

EXAMPLE 15

Two hours after being prepared, 14.3 g of catlyst complex of Example 1 are suspended in a solution containing 200 ml of hexane and 10 ml of AlEt$_2$Cl. 2 ml of n-hexene are added to the stirred suspension. After 10 minutes, the liquid phase is siphoned off and the solid obtained is washed 3 times with 100 ml of hexane. The solid suspended in hexane is used for a polymerization experiment and the properties described below are obtained:

| age | α | % soluble | ASG |
|---|---|---|---|
| 1 | 1,300 | 1 | 426 |
| 60 | 1,200 | 0.8 | 400 |

EXAMPLE 16

This relates to the preparation of a prepolymer from the catalyst complex of Example 1 and its use in due course as a catalyst for gas phase polymerization of propylene.

A. PREPARATION OF THE PREPOLYMER 2 ml of a solution of AlEt$_2$Cl in hexane (concentration 200 mg of AlEt$_2$Cl/ml), representing 400 mg of AlEt$_2$Cl, and 118 mg of the catalyst complex of Example 1, 3 hours after its preparation, are introduced, under a stream of propylene gas, into a 1 liter autoclave which as been previously dried and kept under an atmosphere of pure and dry nitrogen.

The autoclave is closed, and H$_2$ at 0.7 kg a (absolute)/cm$^2$ and 500 ml of pure liquid propylene are introduced. Stirring is started, at 300 revolutions/minute, and the temperature is raised to 60° C.

After 24 minutes, the unconsumed propylene is released and the autoclave is cooled. 100 g of prepolymer, in which the weight ratio $$\frac{\text{prepolymer}}{\text{initial catalyst complex}}$$

is 848, are collected under an inert atmosphere.

B. USE OF PREPOLYMER AS A POLYMERIZATION CATALYST FOR PROPYLENE, 1 DAY AFTER THE MANUFACTURE OF THE PREPOLYMER 50 g of the prepolymer prepared under a. are introduced under a stream of propylene gas, into a dry 5 l autoclave kept under a N$_2$ atmosphere and equipped with a stirrer of which the two vanes match the profile of the bottom of the autoclave. The autoclave is closed and H$_2$ is introduced at 0.8 kg a/cm$^2$. The temperature of the autoclave is thereafter raised to 70° C., the stirrer is started and propylene gas is simultaneously introduced at 26 kg a/cm$^2$ for 4 hours. Thereafter, the gas is released from the autoclave and the temperature is lowered. 609 g of polypropylene are collected. The catalytic activity of the prepolymer and the characteristics of the polypropylene collected, without having undergone any purification or washing treatment, are described in Table 11.

C. USE OF THE PREPOLYMER AS THE CATALYST FOR THE POLYMERIZATION OF PROPYLENE, 20 DAYS AFTER THE MANUFACTURE OF THE PREPOLYMER

The polymerization is carried out as described in B above. The properties of the prepolymer and of the polypropylene obtained are described in Table 11.

Table 11

| Age of the prepolymer (days) | α | Insoluble polypropylene | | | Ti content, ppm |
|---|---|---|---|---|---|
| | | G | MFI | ASG | |
| 1 | 2,960 | 943 | 3.7 | 483 | 26 |
| 20 | 2,800 | 940 | 3 | 490 | 28 |

It will be understood that the above description of the present invention is susceptible to various modifications, changes and adaptations and the same are intended to be comprehended within the meaning and range of equivalents of the appended claims.

We claim:

1. A storage stable catalytic complex for stereospecific α-olefin polymerization prepared by:
    (a) reducing TiCl$_4$ with a reducing agent of the formula AIR$_n$X$_{3-n}$ wherein R is a hydrocarbon radical with from 1 to 18 carbon atoms, X is a halogen, and n is a positive number which is at most 3;
    (b) treating thus obtained reduced solid with a complexing agent which is an organic compound with at least one atom or group having at least one pair of free electrons capable of effecting coordination with titanium or aluminum, and is a compound of one of the formulae:

R'—O—R", R'—S—R", and R'—SH wherein
    R' is a hydrocarbon radical with from 1 to 15 carbon atoms, and
    R" is a hydrocarbon radical with from 1 to 15 carbon atoms;
    (c) reacting resulting treated solid with TiCl$_4$; (d) isolating thus formed catalytic complex;
    (e) contacting thus formed catalytic complex with a stabilizing amount of a preactivator consisting of an organic compound of a metal of one of groups Ia, IIa, IIb and IIIa of the Periodic Table, less than 10 hours after isolation of the catalytic complex.

2. A storage stable catalytic complex prepared according to claim 1, wherein the contacting is carried out less than 1 hour after isolation of the catalytic complex.

3. A storage stable catalytic complex prepared according to claim 1, wherein the molar ratio of the preactivator to the complexing agent present in the catalytic complex is at least 1.

4. A storage stable catalytic complex prepared according to claim 1, wherein the preactivator is an organoaluminum compound.

5. A storage stable catalytic complex prepared according to claim 1, wherein the preactivator is a compound of the formula AIR'$_p$(OR")$_m$X$_{3-(p+m)}$ wherein
    R' is a hydrocarbon radical containing from 1 to 18 carbon atoms,
    R" is a hydrocarbon radical containing from 1 to 18 carbon atoms,
    X is a halogen,
    p is a positive number of at most 3,
    m is any number from 0 to 1, inclusive, and
    (p+m) is a positive number of at most 3.

6. A storage stable catalytic complex prepared according to claim 5, wherein the atomic radio of the aluminum present in the preactivator to the titanium present in the catalytic complex is between 0.01 and 20.

7. A storage stable catalytic complex prepared according to claim 6, wherein the atomic ratio aluminum/titanium is between 0.03 and 7.5.

8. A storage stable catalytic complex prepared according to claim 5, wherein the preactivator is diethylaluminum chloride.

9. A storage stable catalytic complex prepared according to claim 1, wherein the product of step (e) is submitted to a treatment with an α-olefin under conditions suitable for polymerizing the α-olefin to obtain a prepolymer.

10. A storage stable catalytic complex prepared according to claim 9, wherein said treatment is simultaneous with step (e).

11. A storage stable catalytic complex prepared according to claim 9, wherein said treatment is subsequent to step (e).

12. A storage stable catalytic complex prepared according to claim 9, wherein said α-olefin has 2 to 18 carbon atoms.

13. A storage stable catalytic complex prepared according to claim 9, wherein said treatment is carried out in such a manner that the ratio of prepolymer weight to produce of step (e) weight is less than 1,000.

14. In a process for catalytically polymerizing an α-olefin with a catalyst, the improvement wherein the catalyst is a catalytic complex according to claim 1.

15. In a process for catalytically polymerizing an α-olefin with a catalyst, the improvement wherein the catalyst is a prepolymer according to claim 9.

16. The process according to claim 15, wherein the prepolymer is used to catalyze a suspension polymerization, and the weight ratio of prepolymer to preactivated catalytic complex is between 1.5 and 5.

17. The process according to claim 15, wherein the prepolymer is used to catalyze a gas phase polymerization, and the weight ratio of prepolymer to preactivated catalytic complex is between 100 and 1,000.

18. A process for preparing a storage stable catalytic complex for stereospecific α-olefin polymerization comprising:
(a) reducing $TiCl_4$ with a reducing agent of the formula $AIR_nX_{3-n}$ wherein
R is a hydrocarbon radical with from 1 to 18 carbon atoms,
X is a halogen, and
n is a positive number which is at most 3;
(b) treating thus obtained reduced solid with a complexing agent which is an organic compound with at least one atom or group having at least one pair of free electrons capable of effecting coordination with titanium or aluminum, and is a compound of one of the formulae:

R'—O—R", R'—S—R", and R'—SH wherein

R' is a hydrocarbon radical with from 1 to 15 carbon atoms, and
R" is a hydrocarbon radical with from 1 to 15 carbon atoms;
(c) reacting resulting treated solid with $TiCl_4$;
(d) isolating thus formed catalytic complex; and
(e) contacting thus formed catalytic complex with a stabilizing amount of a preactivator consisting of an organic compound of a metal of one of groups Ia, IIa, IIb, and IIIa of the Periodic Table, less than 10 hours after isolation of the catalytic complex.

19. The process according to claim 18, wherein the contacting is carried out less than 1 hour after isolation of the catalytic complex.

20. The process according to claim 18, wherein the molar ratio of the preactivator to the complexing agent present in the catalytic complex is at least 1.

21. The process according to claim 18, wherein the preactivator is an organoaluminum compound.

22. The process according to claim 18, wherein the preactivator is a compound of the formula $AIR'_p(OR")_mX_{3-(p+m)}$ wherein
R' is a hydrocarbon radical containing from 1 to 18 carbon atoms,
R" is a hydrocarbon radical containing from 1 to 18 carbon atoms,
X is a halogen,
p is a positive number of at most 3,
m is any number from 0 to 1, inclusive, and
(p+m) is a positive number of at most 3.

23. The process according to claim 22, wherein the atomic ratio of the aluminum present in the preactivator to the titanium present in the catalytic complex is between 0.01 and 20.

24. The process according to claim 23, wherein the atomic ratio aluminum/titanium is between 0.03 and 7.5

25. The process according to claim 22, wherein the preactivator is diethylaluminum chloride.

26. The process according to claim 22, wherein the product of step (e) is submitted to a treatment with an α-olefin to obtain a prepolymer.

27. The process according to claim 26, wherein said treatment is simultaneous with step (e).

28. The process according to claim 26, wherein said treatment is subsequent to step (e).

29. The process to claim 26, wherein said α-olefin has 2 to 18 carbon atoms.

30. The process according to claim 26, wherein said treatment is carried out in such a manner that the ratio of prepolymer weight to product of step (e) weight is less than 1,000.

* * * * *